(12) United States Patent
Baskis

(10) Patent No.: US 11,435,035 B1
(45) Date of Patent: Sep. 6, 2022

(54) VOLATILE ORGANIC COMPOUNDS COLLECTION SYSTEM AND METHOD

(71) Applicant: Paul Baskis, Oakland, KY (US)

(72) Inventor: Paul Baskis, Oakland, KY (US)

( * ) Notice: Subject to any disclaimer, the term of this patent is extended or adjusted under 35 U.S.C. 154(b) by 307 days.

(21) Appl. No.: 16/863,560

(22) Filed: Apr. 30, 2020

(51) Int. Cl.
*F17C 13/04* (2006.01)

(52) U.S. Cl.
CPC ...... *F17C 13/04* (2013.01); *F17C 2205/0323* (2013.01); *F17C 2227/0142* (2013.01); *F17C 2250/06* (2013.01)

(58) Field of Classification Search
CPC ............ F17C 2250/06; F17C 2227/014; F17C 2205/032; F17C 13/04
See application file for complete search history.

(56) References Cited

U.S. PATENT DOCUMENTS 5,893,275 A * 4/1999 Henry .................. F25J 3/04636
62/911

FOREIGN PATENT DOCUMENTS

KR 1784139 B1 * 10/2017 ............. B63B 25/16
KR 20180092403 A * 8/2018 ........... B01D 53/002

OTHER PUBLICATIONS

Translated abstract for KR 10 2018 0092403 (Year: 2018).*
Translated abstract for KR 1784139 (Year: 2017).*

* cited by examiner

*Primary Examiner* — Jason K Niesz
(74) *Attorney, Agent, or Firm* — Stoyanov Law PLLC; Roy L. Chan

(57) ABSTRACT

A volatile organic compounds ("VOC") collection system has an inlet, a positive displacement pump ("PDP"), a first automated control valve, a pressure vessel ("PV"), and PV top and bottom portion outlets. The PV has PV top and bottom portions. The inlet receives a VOC emission and is in fluid communication with the PDP through an inlet-PDP connector. The PDP is in fluid communication with the PV through a PDP-PV connector. The first automated control valve is in fluid communication with the PDP-PV connector. The PV top and bottom portions are in fluid communication with the PV top and bottom portion outlets respectively. The inlet-PDP connector is under a pressure that keeps the VOC emission in a vapor phase. The PDP-PV connector and the PV are under a pressure that condenses the VOC emission and separates the VOC emission into a gas phase and a liquid phase.

16 Claims, 1 Drawing Sheet

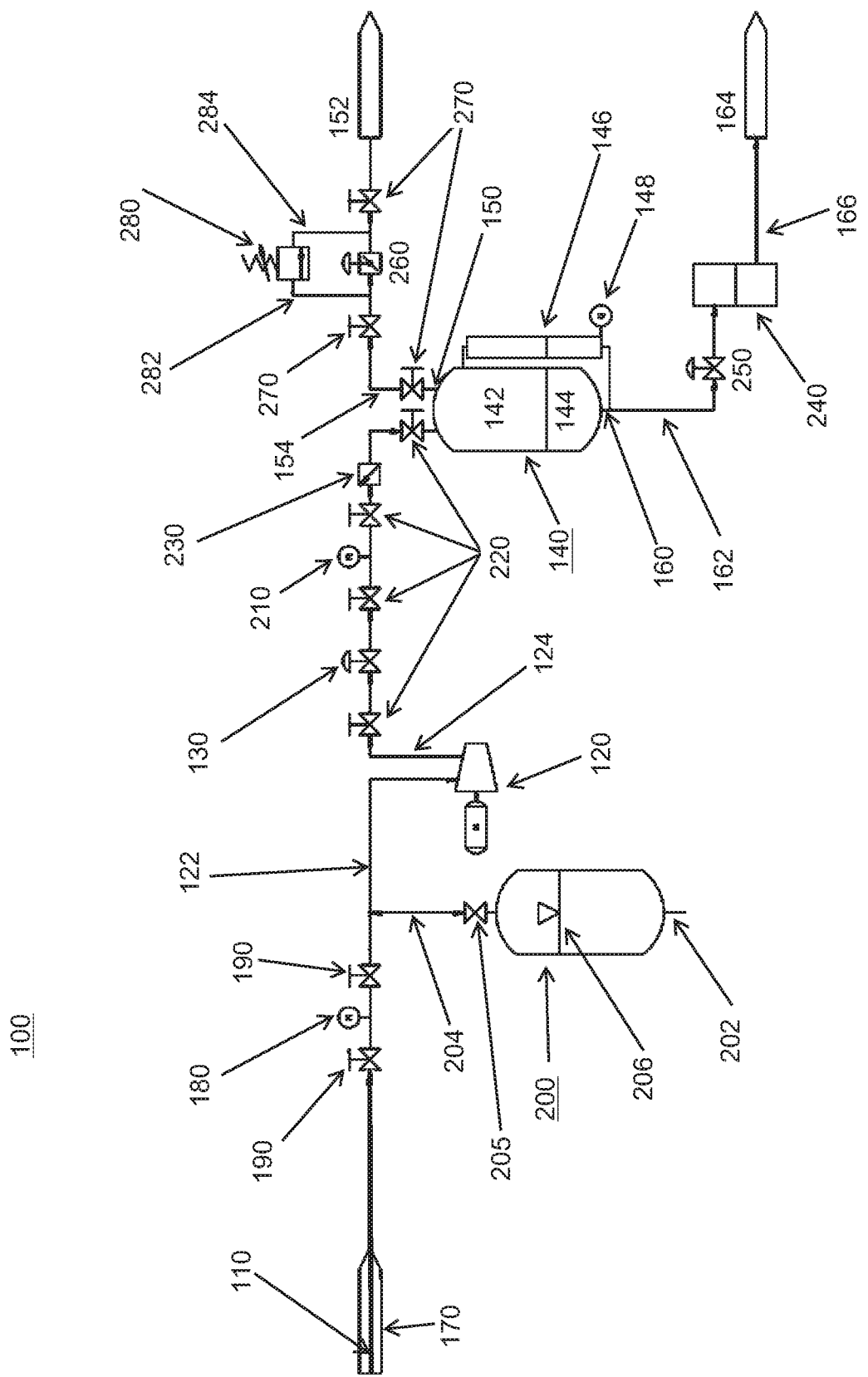

VOLATILE ORGANIC COMPOUNDS COLLECTION SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is related to a volatile organic compounds collection and processing system.

BRIEF SUMMARY OF THE INVENTION

An object of the present invention is a volatile organic compounds collection system comprising an inlet, a positive displacement pump, a first automated control valve, a pressure vessel, a pressure vessel top portion outlet, and a pressure vessel bottom portion outlet. The pressure vessel comprises a pressure vessel top portion and a pressure vessel bottom portion. The inlet receives a volatile organic compound emission. The inlet is in fluid communication with the positive displacement pump through an inlet-positive displacement pump connector. The positive displacement pump is in fluid communication with the pressure vessel through a positive displacement pump-pressure vessel connector. The first automated control valve is in fluid communication with the positive displacement pump-pressure vessel connector. The pressure vessel top portion is in fluid communication with the pressure vessel top portion outlet. The pressure vessel bottom portion is in fluid communication with the pressure vessel bottom portion outlet. The inlet-positive displacement pump connector is under a pressure that keeps the volatile organic compound emission in a vapor phase. The positive displacement pump-pressure vessel connector and the pressure vessel are under a pressure that condenses the volatile organic compound emission and separates the volatile organic compound emission into a gas phase and a liquid phase.

In another object of the present invention, the volatile organic compounds collection system further comprises a blanket gas manifold. The blanket gas manifold is in fluid communication with the inlet-positive displacement pump connector.

In yet another object of the present invention, the volatile organic compounds collection system further comprises a first pressure sensor. The first pressure sensor is in fluid communication with the inlet-positive displacement pump connector.

In another object of the present invention, the volatile organic compounds collection system further comprises at least one first manual control valve. The at least one first manual control valve is in fluid communication with the inlet-positive displacement pump connector.

In yet another object of the present invention, the volatile organic compounds collection system further comprises a bladder tank comprising a bladder, an atmospheric port, and a bladder connector. The bladder tank is in fluid communication with the inlet-positive displacement pump connector through the bladder connector. The bladder may be inflated and deflated through the atmospheric port.

In another object of the present invention, the volatile organic compounds collection system further comprises a second pressure sensor. The second pressure sensor is in fluid communication with the positive displacement pump-pressure vessel connector.

In yet another object of the present invention, the volatile organic compounds collection system further comprises at least one second manual control valve. The at least one second manual control valve is in fluid communication with the positive displacement pump-pressure vessel connector.

In another object of the present invention, the volatile organic compounds collection system further comprises a backflow prevention valve. The backflow prevention valve is in fluid communication with the positive displacement pump-pressure vessel connector.

In yet another object of the present invention, the pressure vessel further comprises a sight glass and a level sensor.

In another object of the present invention, the volatile organic compounds collection system further comprises a liquid phase pump. The liquid phase pump is in fluid communication with the pressure vessel bottom portion outlet through a pressure vessel bottom portion outlet-liquid phase pump connector. The liquid phase pump is in fluid communication with a liquid phase storage tank through a liquid phase pump-liquid phase storage tank connector.

In yet another object of the present invention, the volatile organic compounds collection system further comprises at least one third control valve. The at least one third control valve is in fluid communication with the pressure vessel bottom portion outlet-liquid phase pump connector.

In another object of the present invention, the pressure vessel top portion outlet is in fluid communication with a volatile organic compound digester through a pressure vessel top portion outlet-volatile organic compound digester connector.

In yet another object of the present invention, the volatile organic compounds collection system further comprises a second automated control valve. The second automated control valve is in fluid communication with the pressure vessel top portion outlet-volatile organic compound digester connector.

In another object of the present invention, the volatile organic compounds collection system further comprises at least one fourth manual control valve. The at least one fourth manual control valve is in fluid communication with the pressure vessel top portion outlet-volatile organic compound digester connector.

In yet another object of the present invention, the volatile organic compounds collection system further comprises a manual overpressure valve. The manual overpressure valve is in fluid communication with the pressure vessel top portion outlet-volatile organic compound digester connector through a first manual pressure valve connector. The manual overpressure valve is in fluid communication with the pressure vessel top portion outlet-volatile organic compound digester connector through a second manual pressure valve connector. The first manual pressure valve connector is fluid communication with the pressure vessel top portion outlet-volatile organic compound digester connector between the pressure vessel and the second automated control valve. The second manual pressure valve connector is fluid communication with the pressure vessel top portion outlet-volatile organic compound digester connector between the second automated control valve and the volatile organic compound digester.

In another object of the present invention, a method of collecting and processing volatile organic compounds comprises receiving a volatile organic compound emission through an inlet, processing the volatile organic compound emission through a volatile organic compounds collection system, establishing fluid communication between the inlet and the positive displacement pump through an inlet-positive displacement pump connector, establishing fluid communication between the positive displacement pump, the first automated control valve, the pressure vessel, the pressure vessel top portion outlet, and the pressure vessel bottom portion outlet, maintaining the inlet-positive displacement pump connector under a pressure that keeps the volatile organic compound emission in a vapor phase, and separating the volatile organic compound emission into a gas phase and a liquid phase in the pressure vessel under a pressure that condenses the volatile organic compound emission and separates the volatile organic compound emission into the gas phase and the liquid phase. The volatile organic compounds collection system comprises the inlet, a positive displacement pump, a first automated control valve, a pressure vessel, a pressure vessel top portion outlet, and a pressure vessel bottom portion outlet. The pressure vessel comprises a pressure vessel top portion and a pressure vessel bottom portion.

BRIEF DESCRIPTION OF THE SEVERAL VIEWS OF THE DRAWING

The advantages and features of the present invention will be better understood as the following description is read in conjunction with the accompanying drawings, wherein:

FIG. 1 is a diagram of an embodiment of the present invention.

For clarity purposes, all reference numerals may not be included in every FIGURE.

DETAILED DESCRIPTION OF THE INVENTION

As illustrated in FIG. 1, an embodiment of the present invention is a volatile organic compounds (VOC) collection system 100 comprising an inlet 110, a positive displacement pump 120, a first automated control valve 130, a pressure vessel 140 (e.g., a tank for fluids under pressure), a pressure vessel top portion outlet 150, and a pressure vessel bottom portion outlet 160. The pressure vessel 140 comprises a pressure vessel top portion 142 and a pressure vessel bottom portion 144. The inlet 110 receives a VOC emission. The inlet 110 is in fluid communication with the positive displacement pump 120 through an inlet-positive displacement pump connector 122. The positive displacement pump 120 is in fluid communication with the pressure vessel 140 through a positive displacement pump-pressure vessel connector 124. The first automated control valve 130 is in fluid communication with the positive displacement pump-pressure vessel connector 124. The pressure vessel top portion 142 is in fluid communication with the pressure vessel top portion outlet 150. The pressure vessel bottom portion 144 is in fluid communication with the pressure vessel bottom portion outlet 160. The inlet-positive displacement pump connector 122 is under a pressure that keeps the VOC emission in a vapor phase, for example 0.15 psi. The positive displacement pump-pressure vessel connector 124 and the pressure vessel 140 are under a pressure that condenses the VOC emission and separates the VOC emission into a gas phase and a liquid phase. One of ordinary skill in the art would appreciate what pressure is required to keep the VOC emission in a vapor phase and what pressure would condense the VOC emission and separate it into a gas phase and a liquid phase. These pressures are dependent on various factors, including the type of VOCs in the VOC emission and temperature. For the pressure that would condense the VOC emission, it is preferable for this pressure to be around 135 psi. However, for some VOC emissions, the pressure may be around 300 psi, and possibly greater than 600 psi. In these higher pressure-required situations, it may be desirable to cool the system using known cooling methods to utilize a lower temperature, as condensation pressure may be dependent upon temperature.

The VOC collection system 100 may further comprise a blanket gas manifold 170. The blanket gas manifold 170 is in fluid communication with the inlet-positive displacement pump connector 122. The blanket gas manifold 170 allows the introduction of an inert blanket gas into the system to avoid potential explosion, fire or other hazards. For example, the blanket gas manifold 170 may introduce an inert gas, such as nitrogen, into a system for extracting cannabis for fire suppression. One advantage of the present invention, for this example, is that cannabis extract contains terpenes (a type of VOCs), which may pose a fire hazard. An inert blanket gas would reduce the risk of fire and may be used for fire suppression.

The VOC collection system 100 may further comprise a first pressure sensor 180. The first pressure sensor 180 is in fluid communication with the inlet-positive displacement pump connector 122. The first pressure sensor 180 may be connected to a control system, which an operator may regulate and set the pressure in the system from the inlet 110 to the positive displacement pump 120, for example, by regulating the pressure of the incoming fluid through the inlet, or by controlling, adjusting, or operating, the positive displacement pump 120.

The VOC collection system 100 may further comprise at least one first manual control valve 190. The at least one first manual control valve 190 is in fluid communication with the inlet-positive displacement pump connector 122. The at least one first manual control valve 190 may be utilized for maintenance of the system. FIG. 1 illustrates an embodiment with two first manual control valves 190, although the system may be configured with less than or more than two first manual control valves 190.

The VOC collection system 100 may further comprise a bladder tank 200 having an atmosphere port 202. The bladder tank 200 is in fluid communication with the inlet-positive displacement pump connector 122 through a bladder connector 204. The bladder tank 200 may interact with the atmosphere through atmosphere port 202, which allows for the filling and emptying of bladder tank 200 that further allows for the equalization of blanket gas (if blanket gas is used with the VOCs) and allows for the filling and emptying in tanks that are connected to the blanket gas manifold 170 in an adjacent processing system, for example, an adjacent processing system (not shown) which feeds VOCs to the collection system according to the present invention. The filling and emptying of the bladder tank 200, inflates and deflates the bladder 206 when the adjacent processing system tanks are filled or emptied, respectively. This maintains the pressure in bladder connector 204 and pump connector 122 by responding to atmospheric pressure changes analogous to open tanks, while the bladder completely isolates bladder connector 204 and pump connector 122 from the atmosphere. The size of the bladder 206 is determined by the size of the largest tank in the adjacent processing system (not shown) so that the bladder tank 200 can be filled completely and/or emptied completely without over pressuring the bladder 206 and kicking on the positive displacement pump 120 so that the positive displacement pump 120 would only be activated if there was an event in the adjacent processing system (not shown) such as a leak from a high pressure vessel which may also affect the pressure in the inlet-positive displacement pump connector 122 that would be measured by first pressure sensor 180. The system may comprise one or more bladder tank manual control valves 205 that in fluid communication with the bladder connector 204 and the bladder tank 200.

The VOC collection system 100 may further comprise a second pressure sensor 210. The second pressure sensor 210 is in fluid communication with the positive displacement pump-pressure vessel connector 124. The second pressure sensor 210 may be connected to a control system, which an operator may regulate and set the pressure in one or more of the positive displacement pump-pressure vessel connector 124, the pressure vessel top portion outlet-volatile organic compound digester connector 154, the pressure vessel top portion 142, and the second automated control valve 260. The operator sets the pressure to the pressure that separates the VOC emission into a gas phase and a liquid phase.

In the pressure vessel 140, the VOC emission is compressed to a gas phase and a liquid phase separation. Compounds that do not condense at the set condensation pressure form a gas in the pressure vessel top portion 142. Compounds that condense at the set pressure form a liquid phase in the pressure vessel bottom portion 144.

The VOC collection system 100 may further comprise at least one second manual control valve 220. The at least one second manual control valve 220 is in fluid communication with the positive displacement pump-pressure vessel connector 124. The at least one second manual control valve 220 may be utilized for maintenance of the system. FIG. 1 illustrates an embodiment with four second manual control valves 220, although the system may be configured with less than or more than four second manual control valves 220.

The VOC collection system 100 may further comprise a backflow prevention valve 230. The backflow prevention valve 230 is in fluid communication with the positive displacement pump-pressure vessel connector 124 and the pressure vessel top portion 142.

The pressure vessel 140 may further comprise a sight glass 146 and a level sensor 148. An operator may utilize the sight glass 146 to observe and monitor the gas and liquid phase levels. The level sensor 148 may be connected to a control system, which an operator may regulate and control the gas and liquid phase levels.

The VOC collection system 100 may further comprise a liquid phase pump 240. The liquid phase pump 240 is in fluid communication with the pressure vessel bottom portion outlet 160 through a pressure vessel bottom portion outlet-liquid phase pump connector 162. The liquid phase pump 240 is in fluid communication with a liquid phase storage tank 164 through a liquid phase pump-liquid storage tank connector 166. The liquid phase pump 240 may be utilized to pump the liquid phase to the liquid phase storage tank 164. The VOC collection system 100 may further comprise at least one third control valve 250, which maybe automated or manual valve. The at least one third control valve 250 is in fluid communication with the pressure vessel bottom portion outlet-liquid phase pump connector 162. The at least one third control valve 250 may be utilized for maintenance of the system. FIG. 1 illustrates an embodiment with one third control valve 250, although the system may be configured with less than or more than one third control valve 250.

The pressure vessel top portion outlet 150 may be in fluid communication with a VOC digester (not shown) through a pressure vessel top portion outlet-VOC digester connector 154, and outlet 152. The VOC collection system 100 may further comprise a second automated control valve 260. The second automated control valve 260 is in fluid communication with the pressure vessel top portion outlet-VOC digester connector 154. The second automated control valve 260 may be connected to a control system, which an operator may regulate the pressure within the pressure vessel top portion outlet-volatile organic compound digester connector 154. The VOC collection system 100 may further comprise at least one fourth manual control valve 270. The at least one fourth manual control valve 270 is in fluid communication with the pressure vessel top portion outlet-VOC digester connector 154. The at least one fourth manual control valve 270 may be utilized for maintenance of the system. FIG. 1 illustrates an embodiment with three fourth manual control valves 270, although the system may be configured with less than or more than three fourth manual control valves 270.

The VOC collection system may further comprise a manual overpressure valve 280. The manual overpressure valve 280 is in fluid communication with the pressure vessel top portion outlet-VOC digester connector 154 through a first manual pressure valve connector 282. The manual overpressure valve 280 is in fluid communication with the pressure vessel top portion outlet-VOC digester connector 154 through a second manual pressure valve connector 284. The first manual pressure valve connector 282 is fluid communication with the pressure vessel top portion outlet-VOC digester connector 154 between the pressure vessel 140 and the second automated control valve 260. The second manual pressure valve connector 284 is in fluid communication with the pressure vessel top portion outlet-VOC digester connector 154 between the second automated control valve 260 and the outlet 152 to a VOC digester. The manual overpressure valve 280 may allow the transfer of the gas phase containing the VOC if the second automated control valve 260 should fail. For very toxic VOC, the system may further comprise additional automated control valves and safety overflow valves.

Another embodiment of the present invention is a method of collecting and processing VOC comprising receiving a VOC emission through an inlet 110; processing the VOC emission through a VOC collection system 100; establishing fluid communication between the inlet 110 and the positive displacement pump 120 through an inlet-positive displacement pump connector 122; establishing fluid communication between the positive displacement pump 120, the first automated control valve 130, the pressure vessel 140, the pressure vessel top portion outlet 150, and the pressure vessel bottom portion outlet 160; maintaining the inlet-positive displacement pump connector under a pressure that keeps the VOC emissions in a vapor phase; and, separating the VOC emission into a gas phase and a liquid phase in the pressure vessel 140 under a pressure that condenses the VOC emission and separates the VOC emission into the gas phase and the liquid phase. The VOC collection system 100 comprises the inlet 110, a positive displacement pump 120, a first automated control valve 130, a pressure vessel 140, a pressure vessel top portion outlet 150, and a pressure vessel bottom portion outlet 160. The pressure vessel comprises 140 a pressure vessel top portion 142 and a pressure vessel bottom portion 144.

As an example, the VOC collection system 100 may be utilized to recover solvent used in a system that extracts cannabidiol (CBD) from cannabis and/or hemp. A VOC emission containing the solvent is introduced into the VOC collection system 100 through the inlet 110. As a potential fire hazard is present, an inert gas, such as nitrogen, is introduced through the blanket gas manifold 170. The pressure in the inlet-positive displacement pump connector 122, from the inlet 110 to the positive displacement pump 120, may be set at pressure P1 that preferably keeps the VOC emission in a vapor or gas phase. Pressure P1 will be determined by the operator based on various factors, including temperature, system components (e.g., is a bladder tank used), content of the VOC, and others, and may range from 0.01 psi to over 1000 psi.

The first pressure sensor 180 may be utilized to monitor pressure P1. The first manual control valve(s) 190 may be utilized for maintenance.

As the VOC emission is pumped into the positive displacement pump-pressure vessel connector 124 and pressure vessel 140, the VOC emission may be condensed into a gas phase and a liquid phase as the pressure in the positive displacement pump-pressure vessel connector 124, the pressure vessel 140, and the pressure vessel top portion outlet-volatile organic compound digester connector 154 may be set at pressure P2 at which the VOC would condense and encourage separation of the desired liquid phase (solvent in this CBD extraction example, e.g., alcohol) from the rest of the VOCs or any blanket gases. Pressure P2 will also be determined by the operator based on various factors, including temperature, system components, content of the VOC, desired liquid to be separated, and other factors, and may vary widely.

The second pressure sensor 210 may be utilized to monitor pressure P2. The second manual control valve(s) 220 and the fourth manual control valve(s) 270 may be utilized for maintenance of the VOC collection system 100. The first automated control valve 130 and the second automated control valve 260 may work independently or together to regulate and control pressure P2. The second pressure sensor 210, the first automated control valve 130, and the second automated control valve 260 may be connected to a control system. An operator/user may set pressure P2 in the control system and the second pressure sensor 210 measures pressure P2 and relays back to the control system whether the first automated control valve 130 and/or the second automated control valve 260 need to be adjusted to alter the pressure.

The backflow prevention valve 230 may be utilized for safety reasons. For example, the backflow prevention valve 230 may prevent high pressure fluid from flowing back into the positive displacement pump 120.

As the VOCs enter through the top of the pressure vessel 140, the liquid phase falls to the pressure vessel bottom portion 144 and the gas phase collects in the pressure vessel top portion 142.

The gas phase exits the pressure vessel 140 through the pressure vessel top portion outlet 150 into the pressure vessel top portion outlet-volatile organic compound digester connector 154. The gas phase then exits the VOC collection system 100 through the outlet 152. The gas phase may then be further processed through a digester.

The manual overpressure valve 280 may be utilized as a fail-safe backup valve or for safety reasons. For example, in the event of a malfunction of the second automated control valve 260, the gas phase may flow from the pressure vessel 140, through the pressure vessel top portion outlet 152, into the pressure vessel top portion outlet-volatile organic compound digester connector 154, into the first manual pressure valve connector 280, through the manual overpressure valve 280, into the second manual pressure valve connector 284, and then to the outlet 152, thereby bypassing the malfunctioning second automated control valve 260.

The liquid phase exits the pressure vessel 140 through the pressure vessel bottom portion outlet 160 into the pressure vessel bottom portion outlet-liquid phase pump connector 162. The liquid phase pump 240 pumps the liquid phase from the pressure vessel bottom portion outlet-liquid phase pump connector 162 into the liquid phase pump-liquid phase storage tank connector 166. The liquid phase then is collected into the liquid phase storage tank 164.

The third control valve(s) 250 may be utilized for maintenance, and/or to control the flow of the liquid phase from connector 162 to pump 240. An operator/user may utilize the sight glass 146 and the level sensor 148 to determine the amount of the liquid phase in the pressure vessel 140. Based upon the operator's observations may operate the liquid phase pump 240 to pump the liquid phase into the liquid phase storage tank 166.

In another example, the VOC collection system 100 may be utilized to convert waste into energy (e.g., to convert or separate waste into or from fuel or flammable fluids). A VOC emission from waste processing, or VOC emission containing waste, is introduced into the VOC collection system 100 through the inlet 110. The pressure in the inlet-positive displacement pump connector 122, from the inlet 110 to the positive displacement pump 120, is set at pressure P1 that preferably keeps the VOC emission in a vapor or gas phase. Pressure P1 will be determined by the operator based on various factors, including temperature, system components (e.g., is a bladder tank used), content of the VOC, and others, and may range from 0.01 psi to over 1000 psi, or even several thousand psi if, for example, methane or similar fluids, need to be liquefied or are being collected.

The first pressure sensor 180 may be utilized to monitor pressure P1. The first manual control valve(s) 190 may be utilized for maintenance.

As the VOC emission is pumped into the positive displacement pump-pressure vessel connector 124 and pressure vessel 140, the VOC emission may be condensed into a gas phase and a liquid phase as the pressure in the positive displacement pump-pressure vessel connector 124, the pressure vessel 140, and the pressure vessel top portion outlet-volatile organic compound digester connector 154 may be set at pressure P2. In the waste to energy conversion example. pressure P2 will be determined by the operator based on various factors, including temperature, system components, content of the VOC, desired liquid to be separated, and other factors, and may vary widely.

The second pressure sensor 210 may be utilized to monitor pressure P2. The second manual control valve(s) 220 and the fourth manual control valve(s) 270 may be utilized for maintenance of the VOC collection system 100. The first automated control valve 130 and the second automated control valve 260 may work independently or together to regulate and control pressure P2. The second pressure sensor 210, the first automated control valve 130, and the second automated control valve 260 may be connected to a control system. An operator/user may set pressure P2 in the control system and the second pressure sensor 210 measures pressure P2 and relays back to the control system whether the first automated control valve 130 and/or the second automated control valve 260 need to be adjusted to alter the pressure.

The backflow prevention valve 230 may be utilized for safety reasons. For example, the backflow prevention valve 230 may prevent high pressure fluid from flowing back into the positive displacement pump 120.

As the VOCs enter through the top of the pressure vessel 140, the liquid phase falls to the pressure vessel bottom portion 144 and the gas phase collects in the pressure vessel top portion 142.

The gas phase exits the pressure vessel 140 through the pressure vessel top portion outlet 150 into the pressure vessel top portion outlet-volatile organic compound digester connector 154. The gas phase then exits the VOC collection system 100 through the outlet 152. The gas phase may then be further processed through a digester.

The manual overpressure valve 280 may be utilized for as a fail-safe backup valve or safety reasons. For example, in the event of a malfunction of the second automated control valve 260, the gas phase may flow from the pressure vessel 140, through the pressure vessel top portion outlet 152, into the pressure vessel top portion outlet-volatile organic compound digester connector 154, into the first manual pressure valve connector 280, through the manual overpressure valve 280, into the second manual pressure valve connector 284, and then to the outlet 152, thereby bypassing the malfunctioning second automated control valve 260.

The liquid phase, which in this example may comprise fuel extracted from the VOC emission (including, for example, methane, butane, propane, and other fuels or flammable fluids), exits the pressure vessel 140 through the pressure vessel bottom portion outlet 160 into the pressure vessel bottom portion outlet-liquid phase pump connector 162. The liquid phase pump 240 pumps the liquid phase from the pressure vessel bottom portion outlet-liquid phase pump connector 162 into the liquid phase pump-liquid phase storage tank connector 166. The liquid phase then is collected into the liquid phase storage tank 164. In this example a system according to the present invention maybe used to separate different fluids (e.g., methane, butane, propane) in pressure vessel 140 by liquefying one or more of them in liquid phase (e.g., propane and butane) while others remain in the gas phase (e.g., methane). Pressures P1 and P2 will be selected as needed to achieve the desired separation, as would be known to a person skilled in the art.

The third control valve(s) 250 may be utilized for maintenance, and/or to control the flow of the liquid phase from connector 162 to pump 240. An operator/user may utilize the sight glass 146 and the level sensor 148 to determine the amount of the liquid phase in the pressure vessel 140. Based upon the operator's observations may operate the liquid phase pump 240 to pump the liquid phase into the liquid phase storage tank 166.

While the invention has been described with reference to exemplary embodiments, it will be understood by those skilled in the art that various changes, omissions, and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiments disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

I claim:

1. A volatile organic compounds collection system comprising:
   an inlet;
   a positive displacement pump;
   a first automated control valve;
   a pressure vessel;
   a pressure vessel top portion outlet; and,
   a pressure vessel bottom portion outlet;
   wherein the pressure vessel comprises:
      a pressure vessel top portion; and,
      a pressure vessel bottom portion;
   wherein the inlet receives a volatile organic compound emission;
   wherein the inlet is in fluid communication with the positive displacement pump through an inlet-positive displacement pump connector;
   wherein the positive displacement pump is in fluid communication with the pressure vessel through a positive displacement pump-pressure vessel connector;
   wherein the first automated control valve is in fluid communication with the positive displacement pump-pressure vessel connector;
   wherein the pressure vessel top portion is in fluid communication with the pressure vessel top portion outlet;
   wherein the pressure vessel bottom portion is in fluid communication with the pressure vessel bottom portion outlet;
   wherein the inlet-positive displacement pump connector is under a pressure that keeps the volatile organic compound emission in a vapor phase; and,
   wherein the positive displacement pump-pressure vessel connector and the pressure vessel are under a pressure that condenses the volatile organic compound emission and separates the volatile organic compound emission into a gas phase and a liquid phase.

2. The volatile organic compounds collection system of claim 1 further comprising:
   a blanket gas manifold;
   wherein the blanket gas manifold is in fluid communication with the inlet-positive displacement pump connector.

3. The volatile organic compounds collection system of claim 1 further comprising:
   a first pressure sensor;
   wherein the first pressure sensor is in fluid communication with the inlet-positive displacement pump connector.

4. The volatile organic compounds collection system of claim 1 further comprising:
   at least one first manual control valve;
   wherein the at least one first manual control valve is in fluid communication with the inlet-positive displacement pump connector.

5. The volatile organic compounds collection system of claim 1 further comprising:
   a bladder tank comprising:
   a bladder;
   an atmospheric port; and,
   a bladder connector;
   wherein the bladder tank is in fluid communication with the inlet-positive displacement pump connector through the bladder connector; and, wherein the bladder may be inflated and deflated through the atmospheric port.

6. The volatile organic compounds collection system of claim 1 further comprising:
   a second pressure sensor;
wherein the second pressure sensor is in fluid communication with the positive displacement pump-pressure vessel connector.

7. The volatile organic compounds collection system of claim 1 further comprising:
   at least one second manual control valve;
   wherein the at least one second manual control valve is in fluid communication with the positive displacement pump-pressure vessel connector.

8. The volatile organic compounds collection system of claim 1 further comprising:
   a backflow prevention valve;
   wherein the backflow prevention valve is in fluid communication with the positive displacement pump-pressure vessel connector.

9. The volatile organic compounds collection system of claim 1, wherein the pressure vessel further comprises:
   a sight glass; and,
   a level sensor.

10. The volatile organic compounds collection system of claim 1 further comprising:
    a liquid phase pump;
    wherein the liquid phase pump is in fluid communication with the pressure vessel bottom portion outlet through a pressure vessel bottom portion outlet-liquid phase pump connector; and,
    wherein the liquid phase pump is in fluid communication with a liquid phase storage tank through a liquid phase pump-liquid phase storage tank connector.

11. The volatile organic compounds collection system of claim 10 further comprising:
    at least one third control valve;
    wherein the at least one third control valve is in fluid communication with the pressure vessel bottom portion outlet-liquid phase pump connector.

12. The volatile organic compounds collection system of claim 1, wherein the pressure vessel top portion outlet is in fluid communication with a volatile organic compound digester through a pressure vessel top portion outlet-volatile organic compound digester connector.

13. The volatile organic compounds collection system of claim 12 further comprising:
    a second automated control valve;
    wherein the second automated control valve is in fluid communication with the pressure vessel top portion outlet-volatile organic compound digester connector.

14. The volatile organic compounds collection system of claim 12 further comprising:
    at least one fourth manual control valve;
    wherein the at least one fourth manual control valve is in fluid communication with the pressure vessel top portion outlet-volatile organic compound digester connector.

15. The volatile organic compounds collection system of claim 12 further comprising:
    a manual overpressure valve;
    wherein the manual overpressure valve is in fluid communication with the pressure vessel top portion outlet-volatile organic compound digester connector through a first manual pressure valve connector;
    wherein the manual overpressure valve is in fluid communication with the pressure vessel top portion outlet-volatile organic compound digester connector through a second manual pressure valve connector;
    wherein the first manual pressure valve connector is fluid communication with the pressure vessel top portion outlet-volatile organic compound digester connector between the pressure vessel and the second automated control valve; and,
    wherein the second manual pressure valve connector is fluid communication with the pressure vessel top portion outlet-volatile organic compound digester connector between the second automated control valve and the volatile organic compound digester.

16. A method of collecting and processing volatile organic compounds comprising:
    receiving a volatile organic compound emission through an inlet;
    processing the volatile organic compound emission through a volatile organic compounds collection system, wherein the volatile organic compounds collection system comprises:
      the inlet;
      a positive displacement pump;
      a first automated control valve;
      a pressure vessel;
      a pressure vessel top portion outlet; and,
      a pressure vessel bottom portion outlet;
      wherein the pressure vessel comprises:
        a pressure vessel top portion; and,
        a pressure vessel bottom portion;
    establishing fluid communication between the inlet and the positive displacement pump through an inlet-positive displacement pump connector;
    establishing fluid communication between the positive displacement pump, the first automated control valve, the pressure vessel, the pressure vessel top portion outlet, and the pressure vessel bottom portion outlet;
    maintaining the inlet-positive displacement pump connector under a pressure that keeps the volatile organic compound emission in a vapor phase; and,
    separating the volatile organic compound emission into a gas phase and a liquid phase in the pressure vessel under a pressure that condenses the volatile organic compound emission and separates the volatile organic compound emission into the gas phase and the liquid phase.

* * * * *